United States Patent [19]

Miyagawa

[11] Patent Number: 4,844,584
[45] Date of Patent: Jul. 4, 1989

[54] SEMICONDUCTOR LASER BEAM SPLITTING DEVICE

[75] Inventor: Ichirou Miyagawa, Kanagawa, Japan

[73] Assignee: Fuji Photo Film Co., Ltd., Kanagawa, Japan

[21] Appl. No.: 66,662

[22] Filed: Jun. 26, 1987

[30] Foreign Application Priority Data

Jun. 26, 1986 [JP] Japan ............................... 61-150228
Jun. 26, 1986 [JP] Japan ............................... 61-150229

[51] Int. Cl.⁴ ............................................. G02B 5/30
[52] U.S. Cl. ................................... 350/166; 350/401; 350/404; 372/49; 372/106
[58] Field of Search ............... 350/166, 173, 401, 403, 350/404, 407; 372/49, 100, 106, 27

[56] References Cited

U.S. PATENT DOCUMENTS

| 3,559,090 | 1/1971 | Refermat et al. | 350/173 |
| 3,622,225 | 11/1971 | Buchman | 350/166 |
| 4,373,782 | 2/1983 | Thelen | 350/166 |
| 4,415,233 | 11/1983 | Itoh et al. | 350/173 |
| 4,549,300 | 10/1985 | Mitsuhashi et al. | 372/106 |
| 4,627,688 | 12/1986 | Kobayashi et al. | 350/166 |
| 4,641,926 | 2/1987 | Shirasaki | 350/173 |

Primary Examiner—John K. Corbin
Assistant Examiner—Martin Lerner
Attorney, Agent, or Firm—Sughrue, Mion, Zinn, Macpeak & Seas

[57] ABSTRACT

A semiconductor laser beam splitting device comprises a beam splitting optical system which is disposed on the optical path of light generated from a semiconductor laser and splits the light in a fixed proportion irrespective of the polarized light components contained therein.

5 Claims, 3 Drawing Sheets

SEMICONDUCTOR LASER BEAM SPLITTING DEVICE

BACKGROUND OF THE INVENTION

1. Field of the Invention

This invention relates to a semiconductor laser beam splitting device, and more particularly to a beam splitting device for splitting a laser beam generated from a semiconductor laser beam precisely in a desired proportion irrespective of the amount of light.

2. Description of the Prior Art

A semiconductor laser having a semiconductor laser chip has been used as a scanning light generating means for various scanning recording systems, scanning reading systems and the like. As compared with a gas laser, the semiconductor laser is advantageous in that it is small in size, is inexpensive and has low power consumption, and in that its output can be changed by controlling the driving current (analog direct modulation). Especially for the scanning recording system, the semiconductor laser is very useful since its output can be directly modulated in accordance with signals bearing image information.

However, the semiconductor laser generates both laser light and spontaneous emission, and this fact gives rise to the following difficulty. That is, as can be seen from FIG. 6, line a represents the relation between the electric current imparted to the semiconductor laser and the spontaneous emission output of the semiconductor laser and line be represents the relation between the electric current imparted to the semiconductor laser and the laser light output when the electric current imparted to the semiconductor laser is smaller than a threshold value Io, only spontaneous emission is output from the laser and no laser light is output. Though spontaneous emission output gradually increases with increase in the driving current, the proportion of spontaneous emission output to the total output becomes very small as the driving current exceeds the threshold value Io so that laser light begins to be output and laser light output increases. The spontaneous emission output finally comes to be negligible. The relation between the driving current and the total output is represented by line c in FIG. 6. In order to use the semiconductor laser in the recording system, the reading system and the like described above, it is sometimes preferred that the amount of light generated from the laser be monitored from outside. When monitoring the amount of light generated from a light source, generally a beam splitting element such as a beam splitter is positioned on the optical path of the light generated from the light source to divide the light into two light beams in a desired proportion, and a photodetector is provided to detect the amount of light of one of the two light beams. However, in order to monitor the amount of light of one of the divided light beams by way of the amount of light of the other divided light beam, the light beam generated from the light source must be divided in a fixed proportion irrespective of the amount of light of the light beam. In the case of the light beam generated from the semiconductor laser, the proportion of the laser light to the spontaneous emission changes according to the total amount of light generated therefrom as described above. Since the laser light substantially solely consists of light linearly polarized in the direction parallel to the semiconductor juncture of the semiconductor laser chip while the spontaneous emission includes both light polarized in the direction parallel to the junction and light polarized in the direction normal to the junction in equal proportion, the polarized light components contained in light impinging upon the beam splitting element varies depending on the proportion of the laser light component to the spontaneous emission component which differs with the output range of the semiconductor laser. The polarized light components contained in light impinging upon the beam splitting element affects the division of light by the beam splitting element, and accordingly, the amount of light generated from the semiconductor laser cannot be correctly monitored by conventional beam splitting optical systems.

SUMMARY OF THE INVENTION

In view of the foregoing observations and description, the primary object of the present invention is to provide a semiconductor laser beam splitting device which can split light generated from a semiconductor laser in a fixed proportion irrespective of the output region of the semiconductor laser, i.e., the total amount of light generated from the semiconductor laser.

The semiconductor laser beam splitting device in accordance with the present invention comprises a beam splitting optical system which is disposed on the optical path of light generated from a semiconductor laser and splits the light in a fixed proportion irrespective of the polarized light components contained therein.

The beam splitting optical system may be of a single beam splitter comprising a transparent base, and a plurality of low refraction layers and high refraction layers formed on the transparent base alternately superposed one on another with a low refraction layer forming the uppermost layer, each of the low refraction layers having a refractive index higher than that of the transparent base and each of the high refraction layers having a refractive index higher than that of the low refraction layer. As disclosed in Japanese Unexamined Patent Publication Nos. 58(1983)-190906, 58(1983)-208701 and 58(1983)-208702, for instance, such a multiple layer beam splitter can split incident light into a pair of light beams in a fixed proportion irrespective of the polarized light components contained in the incident light. The proportion in which the incident light is split can be changed by selecting the refractive indexes of the layers and the like. As the material for forming the high refraction layer silicon can be used, for instance,, while as the material for forming the low refraction layer can be used, $TiO_2$, $ZnO_2$, $ZnS$, $Ce_2O_3$, $Al_2O_3$, $CeF_3$, $Nd_2O_3$, $In_2O_3$ and the like.

Otherwise, the beam splitting optical system may comprise a polarizing beam splitter which is disposed on the optical path of light generated from the semiconductor laser and which splits incident light into first light polarized in the direction parallel to the semiconductor junction of the semiconductor laser chip and second light polarized in the direction normal to the semiconductor junction of the semiconductor laser chip, and a beam splitter which is disposed on the optical path of the first light and splits the first light into a pair of lights in a desired proportion.

That is, the component of the incident light (including spontaneous emission and laser light) polarized in the direction normal to the semiconductor junction of the semiconductor laser chip is separated from the component of the incident light polarized in the direction parallel to the junction by the polarizing beam splitter. Thereafter, only light polarized in the direction including all the laser light and about a half of the spontaneous emission generated from the laser is split into a pair of light beams by the beam splitter. Thus, a pair of light beams in a fixed proportion can be obtained irrespective of the amount of light generated from the semiconductor laser.

DESCRIPTION OF THE PREFERRED EMBODIMENTS

Figure 1:
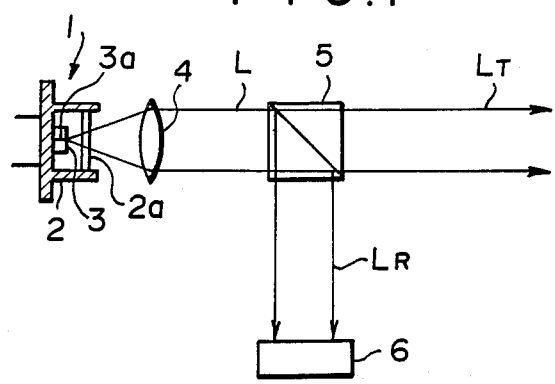
FIG. 1 is a schematic side view of a semiconductor laser beam splitting device in accordance with an embodiment of the present invention.

In FIG. 1, a semiconductor laser 1 comprises a semiconductor laser chip 3 housed in an airtight casing 2. The semiconductor laser 1 generates light in an amount according to the driving current imparted thereto. The light passing through a transparent window 2a on the front surface of the casing 2 is collimated by a collimator lens 4 and impinges upon a multiple layer beam splitter 5. The beam splitter 5 transmits a part of the incident light beam L and reflects the other part of the same, thereby splitting the incident light beam L into a transmission light beam $L_T$ and a reflected light beam $L_R$.

Figure 2:
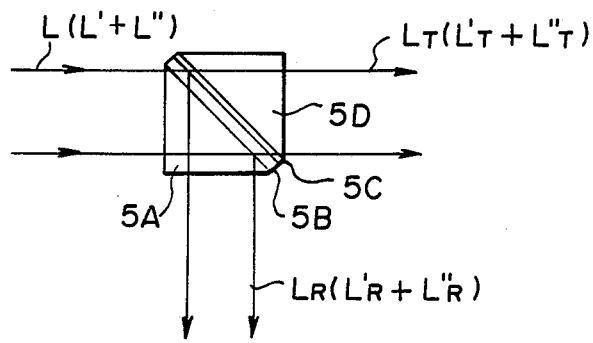
FIG. 2 is a schematic view of the multiple layer beam splitter employed in the device shown in FIG. 1.
Figure 3:
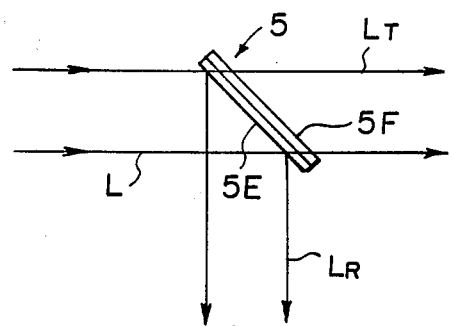
FIG. 3 is a schematic view showing another example of the beam splitter which can be employed in the device shown in FIG. 1.

As shown in FIG. 2, the multiple layer beam splitter 5 comprises a first prism block 5A on which multiple layers 5B such as described above are formed by deposition, and another prism block 5D bonded to the first prism block 5A by an adhesive layer 5C on the multiple layers 5B. The semiconductor laser 1 generates varying relative quantities of both spontaneous emission (including therein a light component polarized in the direction parallel to the semiconductor junction 3a of the semiconductor laser chip 3) a light component polarized in the direction normal to the junction 3a), and laser light substantially solely consisting of light polarized in the direction parallel to the junction 3a dependng on the driving current imparted thereto as described above. Nonetheless the beam splitter 5 splits the incident light beam L into the transmission light beam $L_T$ and the reflected light beam $L_R$ in a fixed proportion irrespective of the polarized light components of the incident light, that is, irrespective of the proportion of the spontaneous emission and the laser light in the incident light beam L. For example, when the beam splitter 5 is arranged to split the incident light beam L into the transmission light beam $L_T$ and the reflected light beam $L_R$ in a proportion of 5:1, the beam splitter 5 splits the light component L' of the incident light beam L which is polarized in the direction parallel to the junction 3a into the parallel transmission light beam $L'_T$ and the parallel reflected light beam $L'_R$ in a proportion of 5:1. The beam splitter 5 also splits the light component L" of the incident light beam L polarized in the direction normal to the junction 3a into the normal transmission light beam $L''_T$ and the normal reflected light beam $L''_R$ in a proportion 5:1 as illustrated in FIG. 2, thereby splitting the entire incident light L in a proportion of 5:1. Accordingly, by providing a photodetector 6 on the optical path of the relfected light beam $L_R$, the transmission light beam $L_T$ can be correctly monitored. The beam splitter 5 may be in the form of a plate comprising a transparent base plate 5F and multiple layers 5E formed thereon as shown in FIG. 3.

Various beam splitters can be used instead of the multiple layer beam splitter 5 so long as the splitter used can split the incident light into a pair of light beams in a fixed proportion irrespective of the polarized light components of the incident light.

Figure 4:
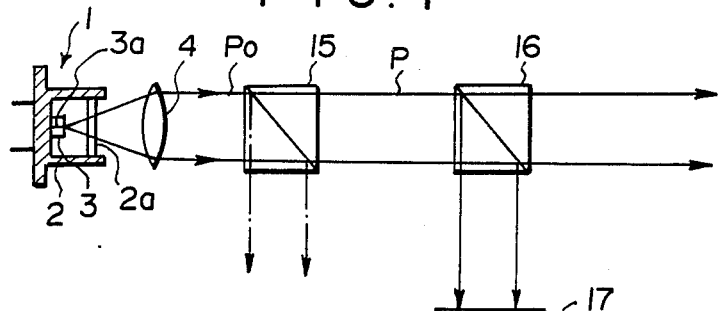
FIG. 4 is a schematic side view of a semiconductor laser beam splitting device in accordance with another embodiment of the present invention.

FIG. 4 shows a semiconductor laser beam splitting device in accordance with another embodiment of the present invention. The device of this embodiment comprises a polarizing beam splitter 15 disposed on the optical path of the light generated from the semiconductor laser 1 and a second beam splitter 16 disposed behind the polarizing beam splitter 15.

The polarizing beam splitter 15 transmits the component of the incident light polarized in the direction parallel to the junction 3a of the semiconductor laser chip 3 and reflects the component of the incident light polarized in the direction normal to the joint surface 3a. That is, the laser light generated from the laser 1 is transmitted through the polarizing beam splitter 5 at a proportion of substantially 100% while about half of the spontaneous emission generated from the laser 1 is reflected into the beam as shown by the chained line in FIG. 4. Accordingly, only the light component polarized in the direction parallel to the junction 3a is transmitted through the beam splitter 15.

Figure 5:
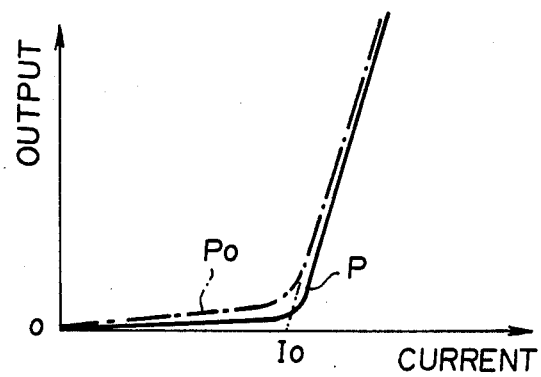
FIG. 5 is a view for illustrating the principle of operation of the embodiment shown in FIG. 4.
Figure 6:
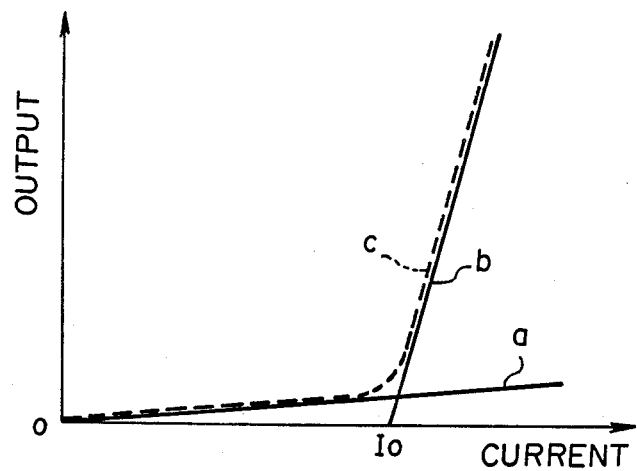
FIG. 6 is a graph showing the relations between the driving current of the semiconductor laser and the spontaneous emission output, and between the driving current and the laser light output.

In FIG. 5, the solid line P shows the relation between the driving current imparted to the semiconductor laser 1 and the amount of light P transmitted through the polarizing beam splitter 15, and the relation between the driving current and the amount of light Po impinging upon the polarizing beam splitter 15.

The light P preferentially transmitted through polarizing the beam splitter 15 impinges uopn the beam splitter 16 which reflects part of the incident light and transmits the other part of the incident light, thereby splitting the incident light into a pair of light beams in a desired proportion. Since the light beam P impinging upon the second beam splitter 16 consists of light components polarized in the same direction as can be understood from the description above, the beam splitter 16 can split the incident light in a fixed proportion irrespective of the amount of the incident light. Accordingly, by providing a photodetector 17 on the optical path of the light reflected by the beam splitter 16, for instance, the transmission light can be correctly monitored.

Though a prism type polarizing beam splitter is used in the embodiment described above, a plate type beam splitter comprising a plate-like base bearing thereon a polarizing layer may be used.

Further though the polarizing beam splitter 15 employed in the embodiment described above reflects the component polarized in the direction normal to the semiconductor junction 3a and transmits the component polarized in the direction parallel to the junction 3a, a beam splitter which reflects the latter component and transmits the former component may be used.

I claim:

1. A laser scanning system for scanning a medium with a light beam comprising:
    a semiconductor laser having a semiconductor laser chip and generating laser light and spontaneous emission in response to a driving current imparted thereto, said laser light and spontaneous emission forming said light beam for said scanning medium;
    means for monitoring the intensity of said light beam from said semiconductor laser; and
    a beam splitting optical system which is disposed on the optical path of said light beam generated from said semiconductor laser and splits the incident light into two beams in a fixed proportion irrespective of the polarized light components contained therein, one of said two beams being for scanning said medium and the other of said two beams being directed for reception by said monitoring means;
    whereby the light beam received by the monitoring means is in a fixed proportion to the light beam for scanning said medium and thus provides an accurate representation of the intensity of the light beam for scanning said medium irrespective of the polarized light components of said light beam generated from said semiconductor laser.

2. A laser scanning system as defined in claim 1 in which said beam splitting optical system comprises a beam splitter consisting of a transparent base, and a plurality of low refraction layers and high refraction layers formed on the transparent base alternately superposed one on another with a low refraction layer forming the uppermost layer, and each of the low refraction layers havng a refractive index higher than that of the transparent base and each of the high refraction layers having a refractive index higher than that of the low refraction layer.

3. A laser scanning system as claimed in claim 1 wherein said light beam is subjected to analog direct modulation to conduct image recording.

4. A laser scanning system for scanning a medium with a light beam comprising:
    a semiconductor laser having a semiconductor laser chip and generating laser light and spontaneous emission in response to a driving current imparted thereto, said laser light and spontaneous emission forming said light beam for scanning said medium;
    means for monitoring the light intensity of said light beam from said semiconductor laser;
    a polarizing beam splitter disposed on an optical path of the light beam generated from the semiconductor laser and splitting the light incident thereon into a first light beam polarized in the direction parallel to a semiconductor junction of the semiconductor laser chip and a second light beam polarized in the direction normal to the semiconductor junction; and
    a second beam splitter disposed on an optical path of said first light beam which splits siad first light beam into a pair of light beams in a desired proportion, one of said pair of light beams being for scanning said medium and the other of said pair of light beams being directed for reception by said monitoring means;
    whereby the light beam received by the monitoring means provides an accurate representation of the intensity of the light beam scanning said medium irrespective of the polarized light components of said light beam generated from said semiconductor laser.

5. A laser scanning system as claimed in claim 4 wherein said light beam is subjected to analog direct modulation to conduct image recording.

* * * * *